United States Patent
Inagawa et al.

(10) Patent No.: US 9,092,795 B2
(45) Date of Patent: Jul. 28, 2015

(54) INFORMATION PROCESSING APPARATUS AND METHOD

(71) Applicants: Nobuhiro Inagawa, Shizuoka-ken (JP); Masanori Sambe, Shizuoka-ken (JP)

(72) Inventors: Nobuhiro Inagawa, Shizuoka-ken (JP); Masanori Sambe, Shizuoka-ken (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 314 days.

(21) Appl. No.: 13/627,008

(22) Filed: Sep. 26, 2012

(65) Prior Publication Data

US 2013/0093869 A1    Apr. 18, 2013

(30) Foreign Application Priority Data

Oct. 12, 2011    (JP) ................. 2011-224759

(51) Int. Cl.
| H04N 7/18 | (2006.01) |
| G06Q 30/02 | (2012.01) |
| H04N 21/41 | (2011.01) |
| H04N 21/414 | (2011.01) |
| H04N 21/81 | (2011.01) |

(52) U.S. Cl.
CPC .......... *G06Q 30/02* (2013.01); *H04N 21/4126* (2013.01); *H04N 21/41415* (2013.01); *H04N 21/812* (2013.01)

(58) Field of Classification Search
CPC ....... G06Q 10/00; G06Q 50/34; G06Q 10/63; G06Q 10/06; G06Q 10/10; G06Q 10/0631; G06Q 30/02
USPC .......... 348/77; 705/7.11, 7.14–25, 7.29–7.34
See application file for complete search history.

(56) References Cited

U.S. PATENT DOCUMENTS

| 8,473,345 B2 * | 6/2013 | Pradeep et al. ............ 705/14.42 |
| 8,484,081 B2 * | 7/2013 | Pradeep et al. ............ 705/14.42 |
| 8,494,905 B2 * | 7/2013 | Pradeep et al. ............ 705/14.42 |

(Continued)

FOREIGN PATENT DOCUMENTS

| JP | 2002-133527 | 5/2002 |
| JP | 2004-206526 | 7/2004 |

(Continued)

OTHER PUBLICATIONS

Japanese Office Action for Japanese Application No. 2011-224759 mailed on Jul. 23, 2013.

*Primary Examiner* — Jay Patel
*Assistant Examiner* — Frank Huang
(74) *Attorney, Agent, or Firm* — Amin, Turocy & Watson, LLP

(57) ABSTRACT

According to an embodiment, an information processing apparatus comprises a customer specification section, a salesclerk specification section and a notification section. The customer specification section specifies a customer as a received target is watching an advertising information displayed on an advertising apparatus advertising a commodity. The salesclerk specification section specifies a salesclerk as a notified target based on at least one of the advertising information that the customer as the received target is watching specified by the customer specification section and the position of each salesclerk. The notification section notifies the existence of the customer as the received target specified by the customer specification section to a portable communication terminal carried by the salesclerk as the notified target specified by the salesclerk specification section.

6 Claims, 13 Drawing Sheets

(56) References Cited

U.S. PATENT DOCUMENTS

| | | | |
|---|---|---|---|
| 8,635,105 B2* | 1/2014 | Pradeep et al. | 705/14.42 |
| 8,655,428 B2* | 2/2014 | Pradeep et al. | 600/383 |
| 8,655,437 B2* | 2/2014 | Pradeep et al. | 600/544 |
| 2006/0241996 A1* | 10/2006 | Burger et al. | 705/9 |
| 2008/0294747 A1* | 11/2008 | Abhyanker | 709/218 |
| 2010/0274619 A1* | 10/2010 | Maresh et al. | 705/9 |
| 2010/0306120 A1* | 12/2010 | Ciptawilangga | 705/319 |
| 2012/0278129 A1* | 11/2012 | Salomatin et al. | 705/7.31 |
| 2014/0039966 A1* | 2/2014 | Browning et al. | 705/7.25 |
| 2014/0310044 A1* | 10/2014 | Meltzer et al. | 705/7.19 |
| 2014/0310045 A1* | 10/2014 | Meltzer et al. | 705/7.19 |

FOREIGN PATENT DOCUMENTS

| | | |
|---|---|---|
| JP | 2009-211578 | 9/2009 |
| JP | 2010-020666 | 1/2010 |

\* cited by examiner

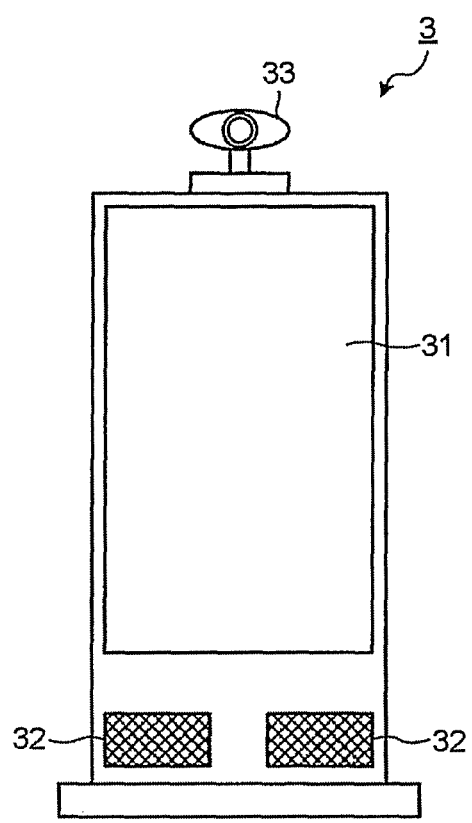

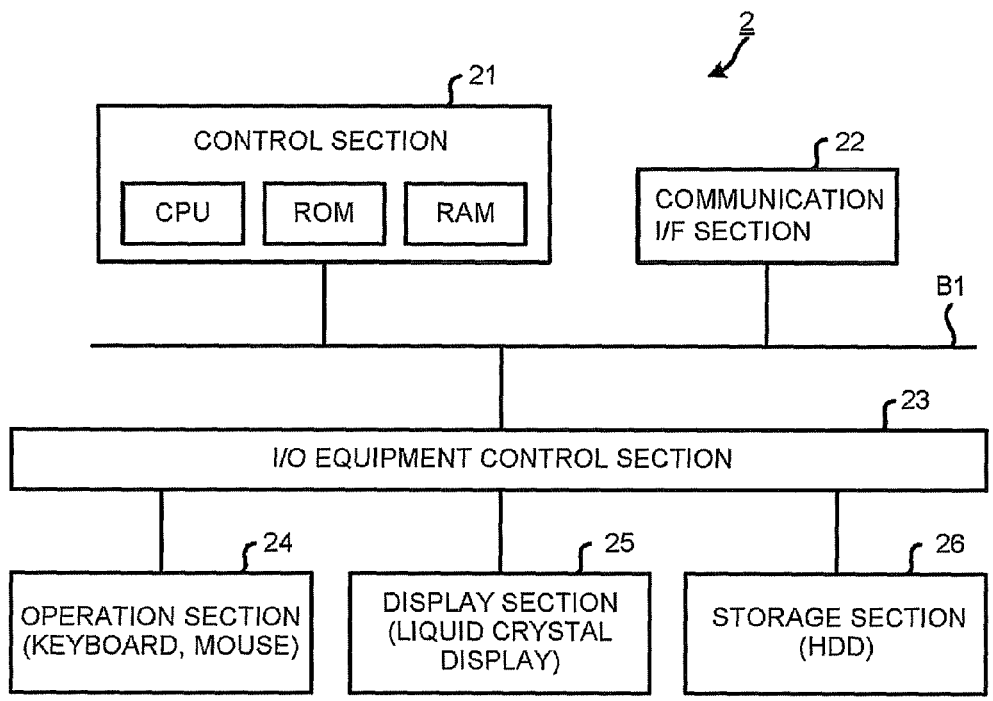

INFORMATION PROCESSING APPARATUS AND METHOD

CROSS-REFERENCE TO RELATED APPLICATION

This application is based upon and claims the benefit of priority from Japanese Patent Application No. 2011-224759, filed Oct. 12, 2011, the entire contents of which are incorporated herein by reference.

FIELD

Embodiments described herein relate to an information processing apparatus and a method.

BACKGROUND

At present, a Digital Signage apparatus was installed in a store such as a supermarket, a department store and the like, a commercial facility such as a shopping mall and the like, and a place selling a commodity, such as a business street, an underground street and the like, and advertising information (the picture and the image of the commodity to be propagandized, an article introducing or describing the propagandized commodity, and the like) relevant with the commodity to be propagandized was displayed after utilizing a display apparatus such as a liquid crystal display or a plasma display and the like.

BRIEF DESCRIPTION OF THE DRAWINGS

FIG. 2 is a front view showing a sketchy appearance composition of a digital signage apparatus;

FIG. 3 is a block diagram showing hardware compositions of a control system of a store server apparatus;

FIG. 4 is a schematic diagram showing a composition example of a registration table;

DETAILED DESCRIPTION

According to an embodiment, an information processing apparatus comprises a customer specification section, a salesclerk specification section and a notification section. The customer specification section specifies a customer as a received target is watching an advertising information displayed on an advertising apparatus advertising a commodity. The salesclerk specification section specifies a salesclerk as a notified target based on at least one of the advertising information that the customer as the received target is watching specified by the customer specification section and the position of each salesclerk. The notification section notifies the existence of the customer as the received target specified by the customer specification section to a portable communication terminal carried by the salesclerk as the notified target specified by the salesclerk specification section.

Hereinafter, embodiments are described below with reference to accompanying drawings.

In addition, the information processing apparatus and a method of the present embodiment generally can notify the existence of the customer watching the advertising information displayed by the advertising apparatus such as a digital signage apparatus and the like to the salesclerk.

Moreover, the information processing apparatus and the method of the present embodiment are applied to an information processing system installed in a store such as a supermarket, a department store and the like, a commercial facility such as a shopping center mall and the like, and a place selling the commodity, such as a business street, an underground street and the like, and in the following description, in the condition that the information processing apparatus and the program of the present embodiment are applied to a store server apparatus installed in an information processing system of a household appliance retail store is described.

The First Embodiment

Figure 1:
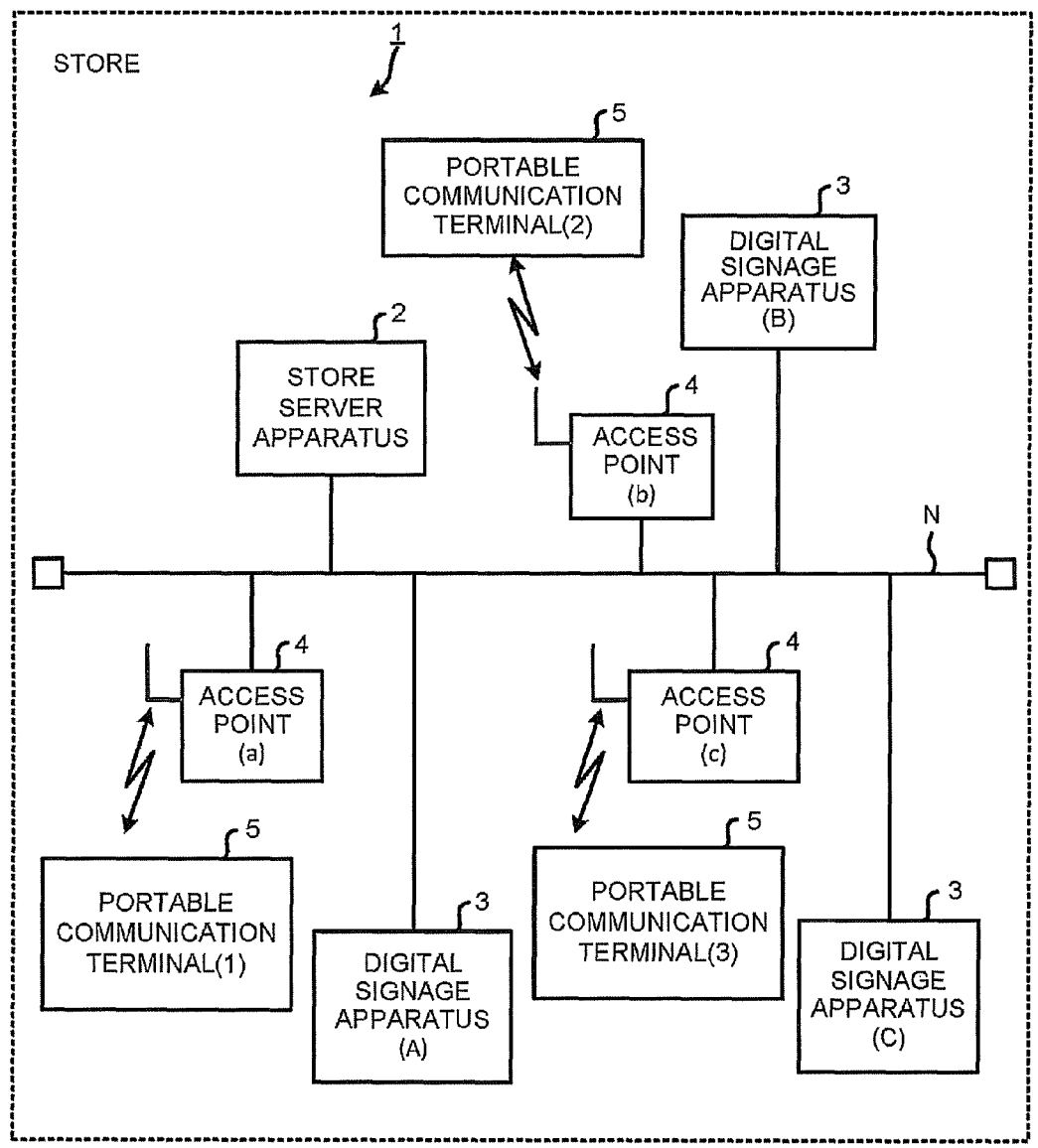
FIG. 1 is a system general drawing showing sketchy compositions of an information processing system.

Sketchy compositions of the information processing system 1 applying the information processing apparatus and the program of the present embodiment are described by utilizing FIG. 1. FIG. 1 is a system general drawing showing the sketchy compositions of the information processing system 1.

As shown in FIG. 1, the information processing system 1 comprises the store server apparatus 2 installed in an office and the like of the electronics retail store (hereinafter called as "store" for short), a plurality of digital signage apparatuses 3 (three in an example in FIG. 1) installed in a store area (a commodity sales field selling the commodity, a store entrance and the like), and a plurality of access points 4 (three in the example in FIG. 1).

In the information processing system 1, the store server apparatus 2, the digital signage apparatuses 3 and the access points 4 can be mutually connected in a communication way by a communication network N such as an LAN (Local Area Network) and the like respectively. Moreover, in the information processing system 1, the access points 4 and the portable communication terminal 5 carried by each salesclerk of the store respectively can be mutually connected in the communication way by a wireless LAN and the like.

The store server apparatus 2 is used as the information processing apparatus of a superior apparatus for the digital signage apparatuses 3, the access points 4, the portable communication terminal 5 and the like. Moreover, the store server apparatus 2 of the present embodiment transmits an advertising content (animation content) used for advertising the commodity to be sold in the store to each digital signage apparatus 3 by the communication network N.

Each digital signage apparatus 3 is the advertising apparatus advertising the commodity sold in the store based on the advertising content received from the store server apparatus 2 through the communication network N. More particularly, each digital signage apparatus 3 displays the advertising information (the picture and the image of an advertised commodity, an article introducing or describing the advertised commodity, and the like) relevant with the propagandized commodity (hereinafter called as "advertised commodity" sometimes) by utilizing a display section 31 (refer to FIG. 2) based on the received advertising content, or outputs sound introducing or describing the advertised commodity by utilizing a sound output section 32 (refer to FIG. 2).

An appearance composition of the digital signage apparatus 3 is described by utilizing FIG. 2. FIG. 2 is a front view showing a sketchy appearance composition of the digital signage apparatus 3. As shown in FIG. 2, the digital signage apparatus 3 comprises the display section, the sound output section 32 and a image capturing section 33.

The display section 31 displays the advertising information relevant with the advertised commodity and is realized by, for instance, a liquid crystal display, a plasma display and the like. The sound output section 32 outputs BGM, the sound introducing or describing the advertised commodity, and the like, and is realized by, for instance, a loudspeaker and the like.

The image capturing section 33 is a image capturing apparatus, is erected on or near the front surface of the digital signage apparatus 3 equipped with the section 33, is used for capturing the customer (particularly the customer watching the advertising information displayed by the display section 31 for a specified time) watching the advertising information displayed by the display section 31 or listening to the sound output by the sound output section 32, and is realized by, for instance, a digital camera capturing a live image, and the like. In addition, in order to improve the recognition precision of a seeing and hearing person, the image capturing section 33 of the present embodiment has a zooming function and the like, and a lens faces to the front direction of the front surface of the digital signage apparatus 3.

Returning to FIG. 1, the plurality of access points 4 are dispersedly installed in the store area and carry out communication with the portable communication terminal 5 entering the communication area {for instance, the range of a circle using the access point 4 as a center mall and having a radius m (such as 5 m)} of equipment per se.

More particularly, each access point 4 acquires the recognition information (hereinafter called as "portable ID") of the portable communication terminal 5 accessing the equipment per se, and transmits the acquired portable ID and the recognition information (hereinafter called as "access point ID") of the equipment per se stored in a store section such as a built-in nonvolatile memory and the like of the equipment per se together to the store server apparatus 2. Moreover, each access point 4 receives notification data notifying reception information needed for subsequent reception carried out by the salesclerk carrying the portable communication terminal 5 from the store server apparatus 2, and transfers the notification data to the portable communication terminal 5.

The portable communication terminal 5 is carried by each salesclerk in the store respectively and is realized by, for instance, a mobile phone, a PDA (Personal Digital Assistant) and the like.

In the information processing system 1 of the present embodiment, an advertising form that the advertised commodity propagandized on each digital signage apparatus 3 is altered according to a place where the digital signage apparatus 3 is installed and elapsed time is adopted, but is not limited to that, and other advertising forms further can be adopted. For instance, the advertising form that all the digital signage apparatuses 3 propagandize the same commodity can be adopted, and the advertising form that each digital signage apparatus 3 repeatedly propagandizes the same commodity in one business day also can be adopted.

Hardware compositions of a control system of the store server apparatus 2 are described by utilizing FIG. 3. FIG. 3 is a block diagram showing the hardware compositions of the control system of the store server apparatus 2.

As shown in FIG. 3, the store server apparatus 2 comprises the hardware compositions utilizing an ordinary computer, for instance, is formed by connecting a control section 21, a communication I/F section 22 and an I/O equipment control section 23 by a bus B1. In addition, the control section 21 comprises a CPU (Central Processing Unit), an ROM (Read Only Memory), an RAM (Random Access Memory) and the like.

The control section 21 is connected with an operation section 24 realized by a keyboard, a mouse and the like, a display section 25 realized by the liquid crystal display and the like, a store section 26 realized by a hard disk drive (HDD: Hard Disk Drive) apparatus, an SSD (Solid State Drive) apparatus and the like, and the like, through the bus B1 and the I/O equipment control section 23.

That is, the control section 21 enables the CPU to control the operations of various composition elements connected through the I/O equipment control section 23 by developing and executing a control program stored in the ROM, the HDD and the like in the RAM, and moreover, to control, receive and transmit the operations of various data such as the advertising content, the notification data and the like between the digital signage apparatus 3 and the access point 4 connected through the communication I/F section 22 and the network N.

All kinds of information such as the advertising content transmitted to each digital signage apparatus 3, a registration table T (refer to FIG. 4) registering information used for specifying the access point 4 near each digital signage apparatus 3, a commodity master file registering the commodity information (a commodity name associated with the commodity bar code of each commodity, information showing commodity price, and the like) of each commodity sold in the store), a sold master file registering the information of a sold commodity, and the like, are stored in the store section 26.

The registration table T is described by utilizing FIG. 4. FIG. 4 is a schematic diagram showing a composition example of the registration table T.

As shown in FIG. 4, the signage ID of each digital signage apparatus 3 is associated in the registration table T, so that the access point ID of the access point 4 installed near each digital signage apparatus 3 is registered.

In the example of the registration table T shown in FIG. 4, the signage ID "A" of the digital signage apparatus (A) 3 (refer to FIG. 1) is associated to register the access point ID of the access point (a) 4. That is, it is means that the access point (a) 4 is installed near the digital signage apparatus (A) 3.

Figure 5:
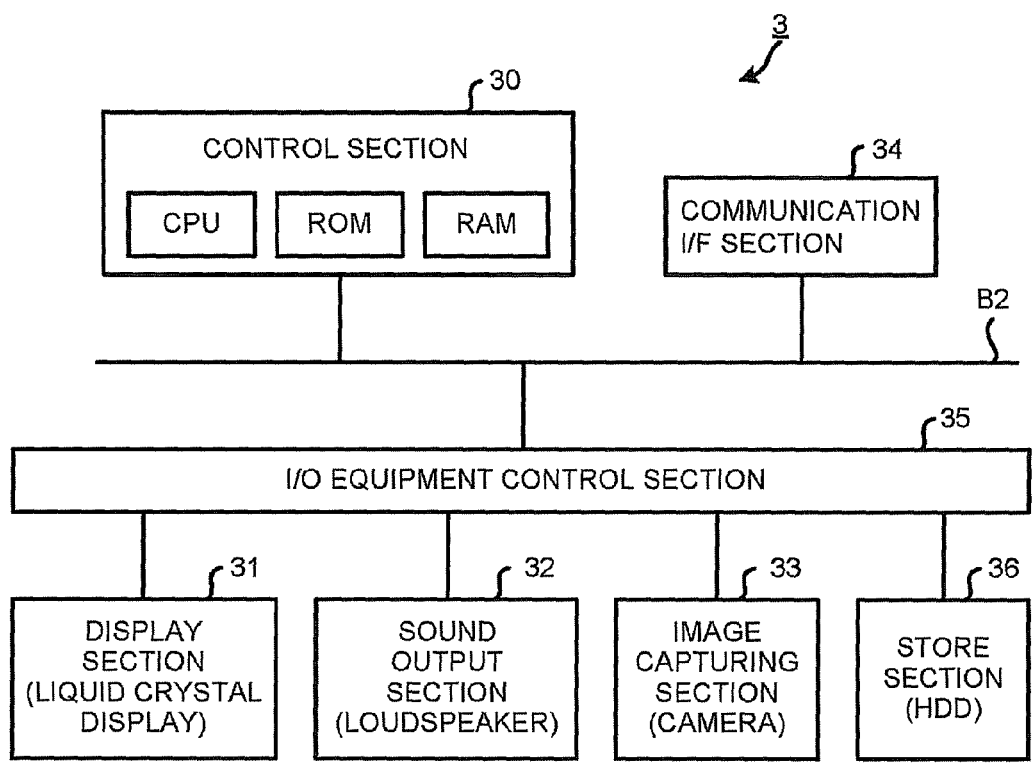
FIG. 5 is a block diagram showing hardware compositions of a control system of the digital signage apparatus.

Hardware compositions of a control system of the digital signage apparatus 3 are described by utilizing FIG. 5. FIG. 5 is a block diagram showing the hardware compositions of the control system of the digital signage apparatus 3.

As shown in FIG. 5, the digital signage apparatus 3 comprises the hardware compositions utilizing the ordinary computer, for instance, is formed by connecting a control section 30, a communication I/F section 34 and an I/O equipment control section 35 through a bus B2. In addition, the control section 30 comprises the CPU (Central Processing Unit), the ROM (Read Only Memory), the RAM (Random Access Memory) and the like.

The control section 30 is connected with the display section 31 realized by the liquid crystal display, the plasma display the like, the sound output section 32 realized by the loudspeaker and the like, the image capturing section 33 realized by the digital camera and the like, a store section 36 realized by the hard disk drive (HDD: Hard Disk Drive) apparatus, the SSD (Solid State Drive) apparatus, the nonvolatile memory and the like, through the bus B2 and the I/O equipment control section 35.

That is, the control section 30 enables the CPU to control the operations of the various composition elements connected through the I/O equipment control section 35 by developing and executing the control program stored in the ROM, the HDD and the like in the RAM, and moreover, to control, receive and transmit the operations of the various data such as the advertising content, a captured image acquired by the image capturing section 33, and the like, between the store server apparatuses 2 connected through the communication I/F section 34 and the network N.

All kinds of information such as the advertising content, the captured image, the recognition information (signage ID) capable of recognizing the equipment per se, and the like, are stored in the store section 36.

When transmitting the captured image to the store server apparatus 2, each digital signage apparatus 3 also transmits the signage ID stored in the store section 36 together.

Figure 6:
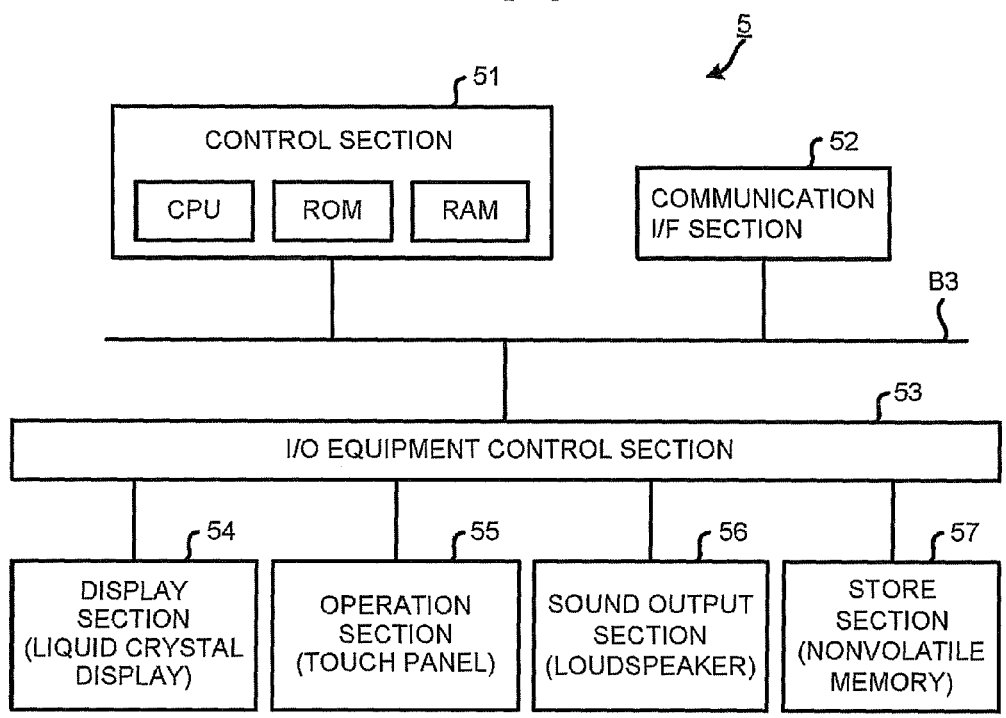
FIG. 6 is a block diagram showing hardware compositions of a control system of a portable communication terminal.

Hardware compositions of a control system of the portable communication terminal 5 are described by utilizing FIG. 6. FIG. 6 is a block diagram showing the hardware compositions of the control system of the portable communication terminal 5.

As shown in FIG. 6, the portable communication terminal 5 comprises the hardware compositions utilizing the ordinary computer, for instance, is formed by connecting a control section 51, a communication I/F section 52 and an I/O equipment control section 53 through a bus B3. In addition, the control section 51 comprises the CPU (Central Processing Unit), the ROM (Read Only Memory), the RAM (Random Access Memory) and the like.

The control section 51 is connected with a display section 54 realized by the liquid crystal display and the like, an operation section 55 realized by a touch panel and the like, a sound output section 56 realized by the loudspeaker and the like, a store section 57 realized by the nonvolatile memory and the like, and the like, through the bus B3 and the I/O equipment control section 53.

That is, the control section 51 enables the CPU to control the operations of the various composition elements connected through the I/O equipment control section 53 by developing and executing the control program stored in the ROM, the HDD and the like in the RAM, and moreover, to control, receive and transmit the operations of the various data such as the notification data, the portable ID stored in the store section 57, and the like, between the access points 4 connected through the communication I/F section 52.

All kinds of information such as the notification data, the portable ID and the like are stored in the store section 57.

Figure 7:
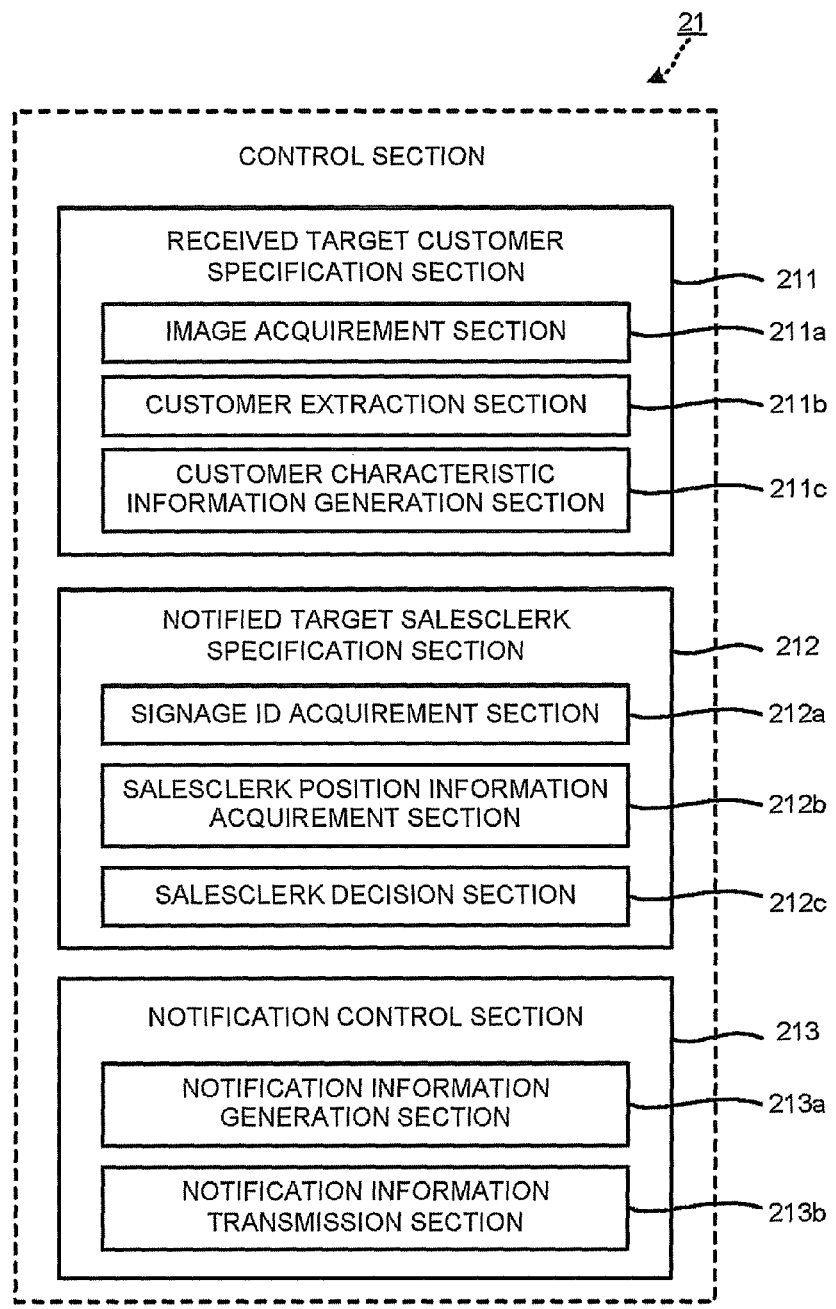
FIG. 7 is a block diagram showing functional compositions of the store server apparatus.

Functional compositions of the store server apparatus 2 are described by utilizing FIG. 7. FIG. 7 is a block diagram showing the functional compositions of the store server apparatus 2.

As shown in FIG. 7, the CPU of the control section 21 exerts functions as a received target customer specification section 211, a notified target salesclerk specification section 212 and a notification control section 213 by developing and executing the program stored in the ROM and the like in the RAM.

The received target customer specification section 211 executes specification processing, that is, specifies the customer who shall be received, namely the customer (hereinafter called as "received target customer" for short) considered to be interested in the commodity (advertised commodity) propagandized by the digital signage apparatus 3. The received target customer specification section 211 comprises a captured image acquirement section 211a, a customer extraction section 211b and a customer characteristic information generation section 211c.

The captured image acquirement section 211a acquires (inputs) the captured image acquired by the image capturing section 33 installed on each digital signage apparatus 3 through the communication network N and the communication I/F section 22.

The customer extraction section 211b extracts the customer watching the advertising information (the picture and the image of the advertised commodity, the article introducing or describing the advertised commodity, and the like) displayed by the display section 31 of each digital signage apparatus 3 for the a specified time (such as above five minutes and the like) as the received target customer from the captured image acquired from the captured image acquirement section 211a. More particularly, the customer extraction section 211b extracts the customer whose face faces to the display section 31 of each digital signage apparatus 3 head on for the a specified time as the received target customer by the recognition processing of the captured image.

The customer characteristic information generation section 211c recognizes the characteristic (gender, inferred age, clothing color and the like) of the received target customer extracted by the customer extraction section 211b, and generates information (hereinafter called as "customer characteristic information" sometimes) showing the recognized characteristic.

Particularly, the customer extraction section 211b and the customer characteristic information generation section 211c read the state (appearance hue, mode (pattern), concave-convex status and the like) of the appearance of the customer (person) as a characteristic quantity according to the captured image, and recognize the customer (person) as a specific object and the characteristic of the customer by comparing the characteristic quantity with that of a pre-registered customer (person).

The way recognizing the customer (person) included in a recognized image is normally called as generic object recognition. About the generic object recognition, various recognition technologies are explicated in the following literature.

Yanai Keiji, "present state and perspectives of generic object recognition", collected papers of information processing society, Vol. 48, No. SIG16 [retrieved on Heisei August 10, 22], Internet <URL:http://mm.cs.uec.ac.jp/IPSJ-TCVIM-Yanai.pdf>.

Moreover, a technology carrying out the generic object recognition by carrying out area segmentation to an image according to a target is explicated in the following literature.

Jamie Shotton and the like, "Semantic Texton Forests for Image Categorization and Segmentation", [retrieved on Heisei August 10, 22], Internet <URL:http://citeseerx.ist.psu.edu/viewdoc/download?doi=10.1.1.145.3036&rep=rep1&type=pdf>.

The notified target salesclerk specification section 212 executes the specification processing, that is, specifies to carry out reception on the received target customer specified by the received target customer specification section 211, and further notifies the salesclerk as the notified target (hereinafter called as "notified target salesclerk" sometimes) of the existence of the received target customer. The notified target salesclerk specification section 212 comprises an signage ID acquirement section 212a, a salesclerk position information acquirement section 212b and a salesclerk decision section 212c.

The signage ID acquirement section 212a acquires the signage ID of the digital signage apparatus 3 displaying the advertising information that the received target customer is watching.

The salesclerk position information acquirement section 212b acquires the portable ID of the portable communication terminal 5 accessing each access point 4 and the access point ID of each access point 4 from each access point 4. That is, in the condition that the plurality of access points 4 are dispersedly configured in the store, the salesclerk position information acquirement section 211b detects the configuration position of each access point 4 as the current position of the portable communication terminal 5 accessing the access point 4.

The signage ID is input in the salesclerk decision section 212c from the signage ID acquirement section 212a; moreover, position information (the portable ID and the access point ID) is input from the salesclerk position information acquirement section 212b; and based on the input information, the salesclerk near the digital signage apparatus 3 displaying the advertising information that the received target customer is watching specified by the received target customer specification section 211 is decided as the notified target salesclerk carrying out the reception on the received target customer and notified of the existence of the received target customer. More particularly, the salesclerk decision section 212c retrieves the registration form table T shown in FIG. 4 and decides the salesclerk carrying the portable communication terminal 5 accessing the access point 4 with the access point ID associated with the input signage ID as the notified target salesclerk.

The notification control section 213 executes notification processing, that is, notifies the existence of the received target customer specified by the received target customer specification section 211 to the portable communication terminal 5 carried by the notified target salesclerk specified by the notified target salesclerk specification section 212. The notification control section 213 comprises a notification information generation section 213a and a notification information transmission section 213b.

The notification information generation section 213a generates the information (refer to a symbol I in FIG. 8) (hereinafter called as "reception information" sometimes) notifying the existence of the received target customer to the notified target salesclerk and further needed for the proper reception of the received target customer carried out by the notified target salesclerk. The reception information comprises the customer characteristic information (the gender, the inferred age, the clothing color and the like) generated by the customer characteristic information generation section 211c, information showing the configuration position of the digital signage apparatus 3 displaying the advertising information that the received target customer is watching, the advertising information that the received target customer is watching, information indicating the reception, information (the detailed information of the advertised commodity, information relevant with other commodities the same as the variety of the advertised commodity, the information of the commodity to be promoted towards the received target customer, and the like) relevant with the commodity propagandized by the advertising information that the received target customer is watching, and the like.

The notification information transmission section 213b transmits the notification data used for displaying (reporting) the reception information generated by the notification information generation section 213a to the portable communication terminal 5 carried by the notified target salesclerk through the access point 4 accessed by the portable communication terminal 5 carried by the notified target salesclerk specified by the salesclerk decision section 212c.

Figure 8:
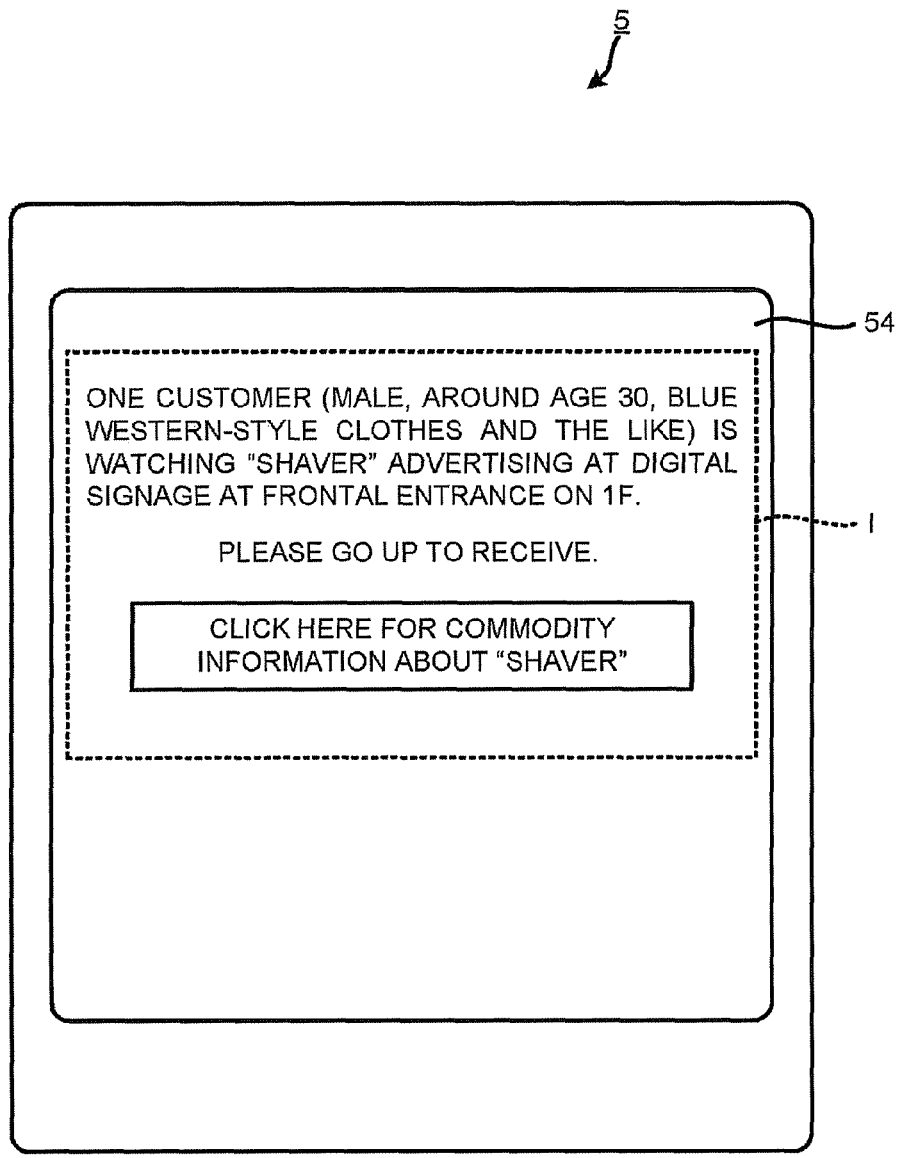
FIG. 8 is a schematic diagram showing an example of reception information displayed on a display section of the portable communication terminal.

An example of the reception information notified by the portable communication terminal 5 carried by the notified target salesclerk based on the notification data transmitted by the notification control section 213 is described by utilizing FIG. 8.

FIG. 8 is a schematic diagram showing a condition that the reception information is notified by the portable communication terminal 5 carried by the notified target salesclerk by utilizing the display section 54 after the notification data are received. As shown in FIG. 8, on the display section 54, the portable communication terminal 5 displays, as the reception information, "male, around age 30, blue western-style clothes" as the information showing the characteristic of the received target customer, "digital signage at a frontal entrance on 1F" as the configuration position of the digital signage apparatus 3 displaying the advertising information that the received target customer is watching, "shaver" as the advertising information that the received target customer is watching, "please go up to receive." as the information indicating the reception, "please go here for the commodity information of the "shaver"" as chain information used for looking up the information (the detailed information of the advertised commodity, the information relevant with other commodities the same as the variety of the advertised commodity, and the like) relevant with the advertised commodity propagandized by the advertising information that the received target customer is watching, and the like.

Figure 9:
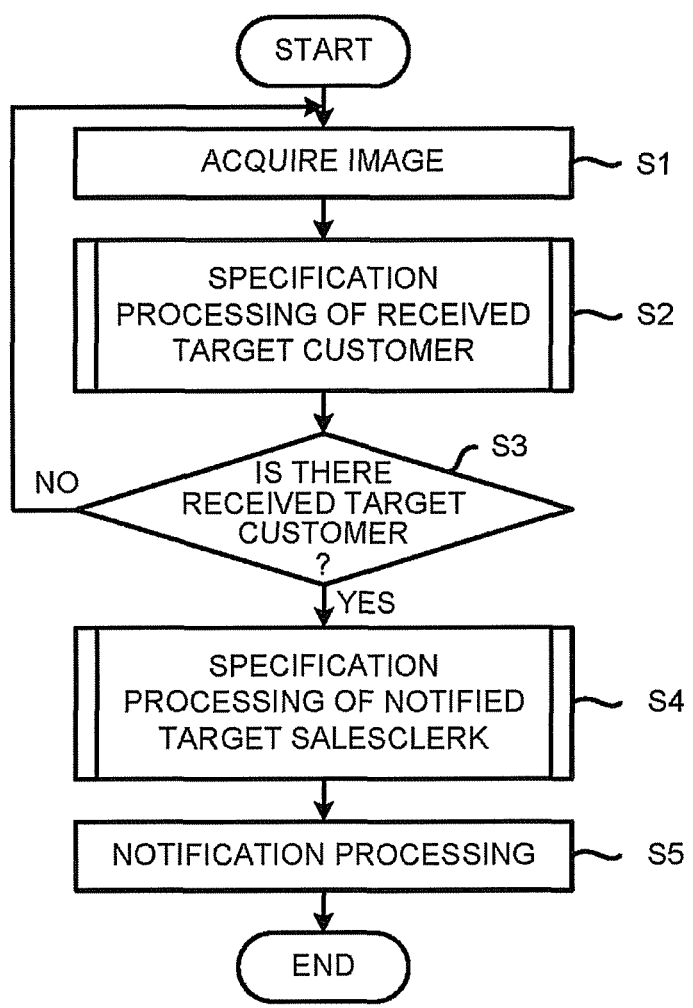
FIG. 9 is a flow chart showing the flow of the processing operations of the store server apparatus.

Processing operations of the store server apparatus 2 are described by utilizing FIG. 9 to FIG. 15. FIG. 9 is a flow chart showing the flow of the processing operations of the store server apparatus 2.

As shown in FIG. 9, in the store server apparatus 2, first, the received target customer specification section 211 executes the operations, and the captured image acquirement section 211a acquires the captured image captured by the image capturing section 33 installed on each digital signage apparatus 3 from each digital signage apparatus 3 (Act S1).

The received target customer specification section 211 executes the specification processing (to FIG. 10) of specifying the received target customer (Act S2).

In the specification processing in Act S2, on the condition that the received target customer is judged to exist (Act S3: Yes), the notified target salesclerk specification section 212 executes the operations subsequently and executes the specification processing (refer to FIG. 11) of specifying the notified target salesclerk (Act S4).

The notification control section 213 executes the notification processing and is used for notifying the notified target salesclerk specified in Act S4 to carry out the proper reception on the received target customer (Act S5). That is, in the processing in Act S5, the notification control section 213 executes the notification processing used for displaying the reception information I as shown in FIG. 8 on the portable communication terminal 5 carried by the notified target salesclerk.

Figure 10:
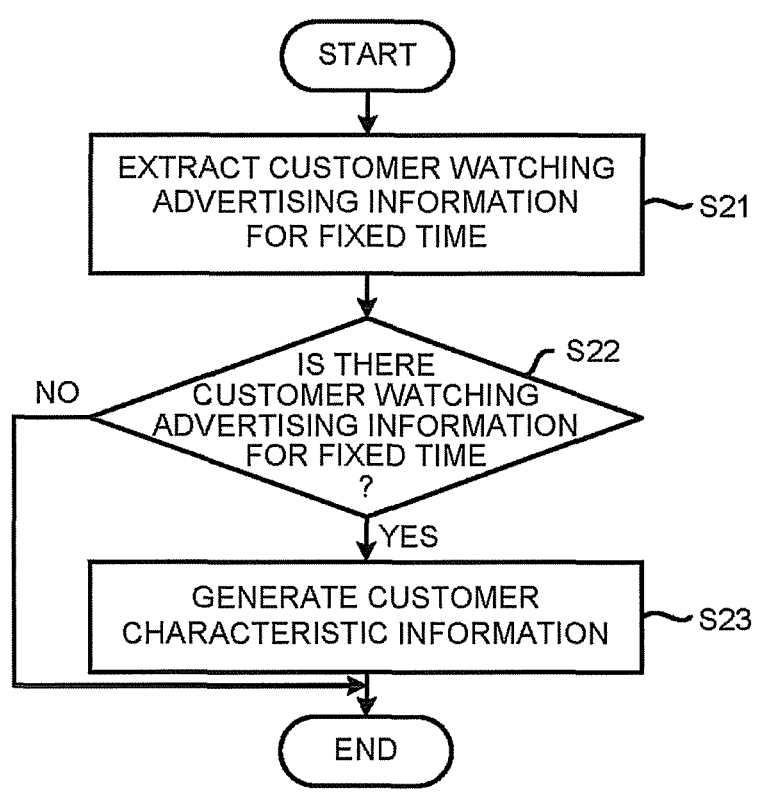
FIG. 10 is a flow chart used for describing the detailed content of the specification processing of a received target customer shown in FIG. 9.

The detailed content of the specification processing of the received target customer in Act S2 is described by utilizing FIG. 10.

FIG. 10 is a flow chart used for describing the detailed content of the specification processing of the received target customer in Act S2 in FIG. 9. As shown in FIG. 10, in the specification processing, first, the customer extraction section 211b executes the processing of extracting (recognizing) the customer (that is, the received target customer) watching the advertising information displayed by the display section 31 of the digital signage apparatus 3 for above the a specified time from the captured image acquired in Act S1 (Act S21).

By the processing in Act S21, in the condition that there is the received target customer (Act S22: Yes), the customer characteristic information generation section 211c extracts (recognizes) the characteristic (the gender, the inferred age, the clothing color and the like) of the received target customer extracted by the customer extraction section 211b and generates the customer characteristic information (the gender, the inferred age, the clothing color and the like) showing the extracted characteristic subsequently (Act S23).

Figure 11:
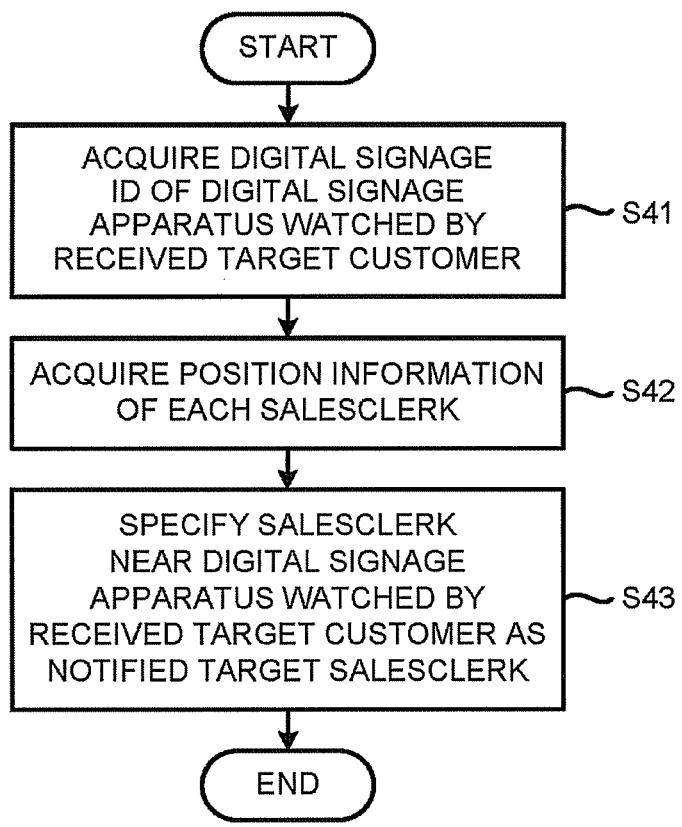
FIG. 11 is a flow chart used for describing the detailed content of the specification processing of a notified target salesclerk shown in FIG. 9.

The detailed content of the specification processing of the notified target salesclerk in Act S4 is described by utilizing FIG. 11.

FIG. 11 is a flow chart used for describing the detailed content of the specification processing of the notified target salesclerk in Act S4 in FIG. 9. As shown in FIG. 11, in the specification process, first, the signage ID acquirement section 212a acquires the signage ID of the digital signage apparatus 3 displaying the advertising information that the received target customer is watching specified by the received target customer specification section 211 (Act S41).

The salesclerk position information acquirement section 212b acquires the position information of each salesclerk (Act S42). That is, in the processing in Act S42, the position of each portable communication terminal 5, that is, the position of each salesclerk is specified by mastering the access point 4 accessed by each portable communication terminal 5.

The salesclerk decision section 212c decides the salesclerk near the digital signage apparatus 3 that the received target customer is watching as the notified target salesclerk carrying out the reception on the received target customer and further notified of the existence of the received target customer based on the signage ID acquired by the signage ID acquirement section 212a and the position information (the portable ID and the access point ID) acquired by the salesclerk position information acquirement section 212b (Act S43).

Figure 12:
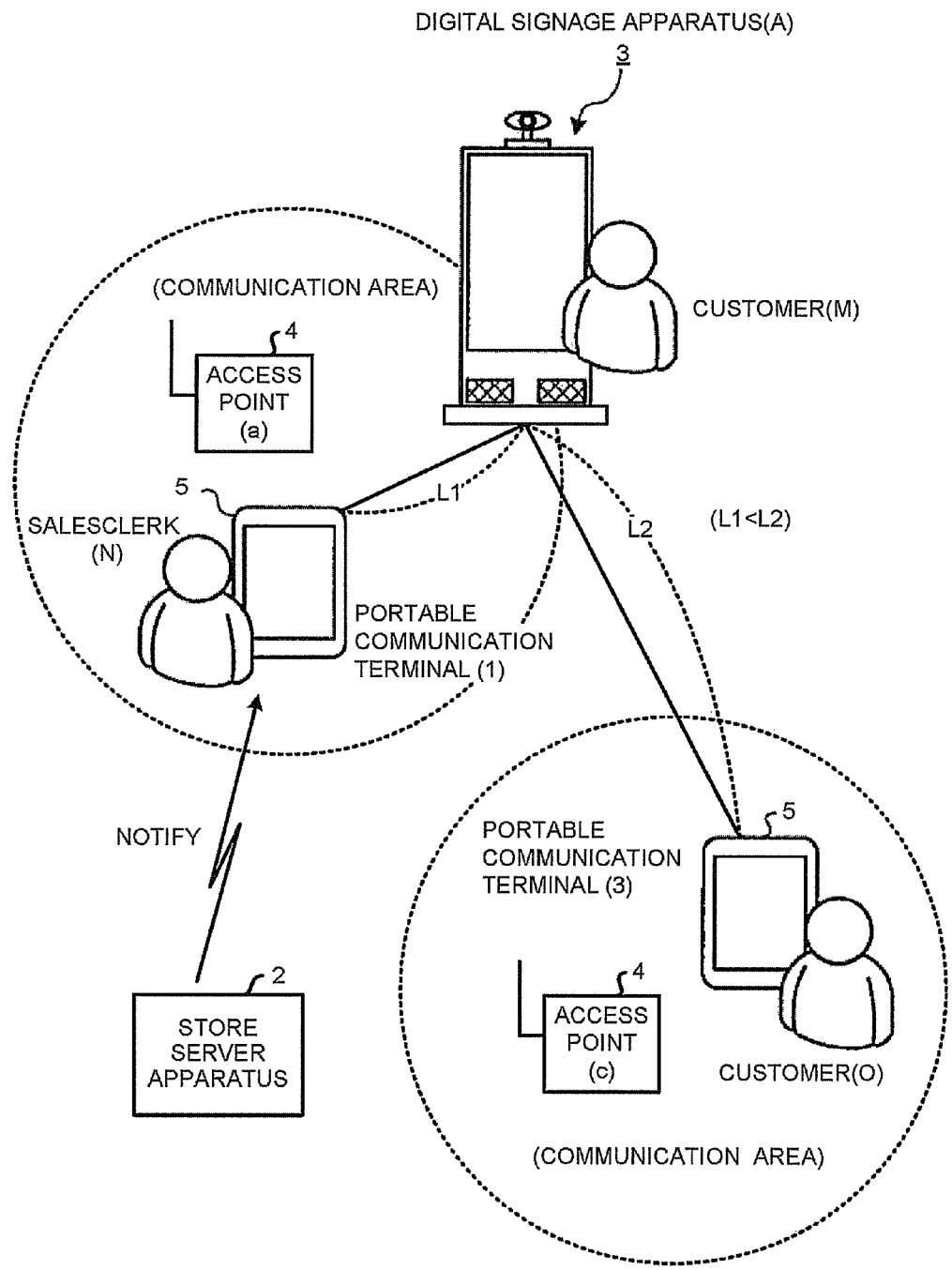
FIG. 12 is a schematic diagram used for describing an example of concrete processing in FIG. 11.

An example of concrete processing in FIG. 11 is described by utilizing FIG. 12. FIG. 12 is a schematic diagram used for describing the example the concrete processing in FIG. 11.

For instance, processing operations in a status shown in FIG. 12 are described. That is, in FIG. 12, in the condition that there are the salesclerk (N) carrying the portable communication terminal (1) 5 whose portable ID is "1" and the salesclerk (O) carrying the portable communication terminal (3) whose portable ID is "3" in the store is shown. Moreover, in FIG. 12, in the condition that the received target customer (M) watches the advertising information displayed on the display section 31 of the digital signage apparatus (A) 3 whose signage ID is "A" is shown. Moreover, in FIG. 12, in the condition that the salesclerk (N) is positioned in the communication area of the access point (a) 4 which is configured near the digital signage apparatus (A) 3 and whose access point ID is "a" is shown. Moreover, in FIG. 12, in the condition that the salesclerk (O) is positioned in the communication area of the access point (c) 4 which is installed at a position separated from the digital signage apparatus (A) 3 and whose access point ID is "c" is shown.

In the example in FIG. 12, in the condition that the distance of the digital signage apparatus (A) 3 and the salesclerk (N) is L1, the distance of the digital signage apparatus (A) 3 and the salesclerk (O) is L2, the relationship of "L1<L2" exists between L1 and L2, and further, the salesclerk (N) approaches the vicinage of the digital signage apparatus (A) 3 more than the salesclerk (O) is shown.

That is, in the status shown in FIG. 12, in the flow chart in FIG. 11, the store server apparatus 2 acquires "A" as the signage ID of the digital signage apparatus (A) 3 displaying the advertising information that the received target customer is watching by the signage ID acquirement section 212a in Act S41.

In Act S42, the salesclerk position information acquirement section 212b acquires the access point ID "a" and the portable ID "1" from the access point (a) 4, and further, acquires the access point ID "c" and the portable ID "3" from the access point (c) 4.

In Act S43, the salesclerk decision section 212c specifies the access point 4 installed near the digital signage apparatus (A) 3 by which the received target customer (M) watches advertising as the access point (a) 4 of the access point ID "a" and specifies the salesclerk (N) carrying the portable communication terminal (1) 5 accessing the access point (a) 4 as the notified target salesclerk based on the signage ID "A" acquired by the signage ID acquirement section 212a and the position information (the access point ID "a", the portable ID "1", the access point ID "c" and the portable ID "3") acquirement by the salesclerk position information acquirement section 212b and with reference to the registration table T shown in FIG. 4.

As thus, after the notification processing in Act S5 in FIG. 9, the reception information I shown in FIG. 8 can be displayed on the display section 54 in the portable communication terminal (1) 5 carried by the salesclerk (N), so that the salesclerk (N) near the received target customer (M) goes up to receive the received target customer (M). Thus, the advertised commodity can be promoted before the received target customer (M) leaves from the vicinage of the digital signage apparatus (A) 3, and therefore, the promotion chance of the advertised commodity and the sell chance of the advertised commodity cannot be missed, so that the improvement of the sales volume of the advertised commodity can be realized.

The Second Embodiment

Figure 13:
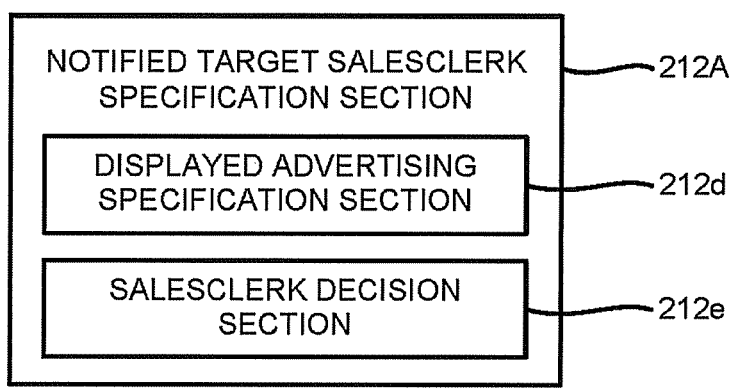
FIG. 13 is a functional block diagram showing the functional compositions of the store server apparatus of a second embodiment.
Figure 14:
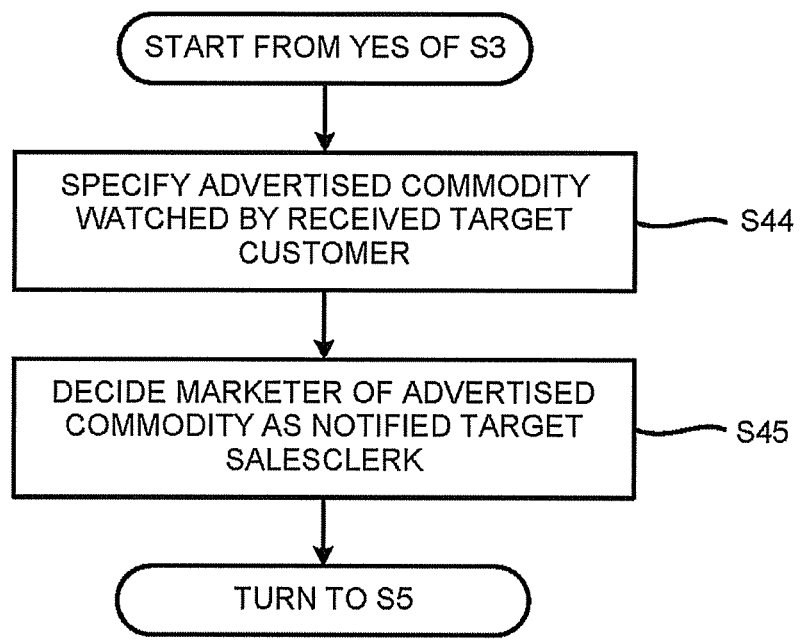
FIG. 14 is a flow chart used for describing the detailed content of the specification processing of the notified target salesclerk of the second embodiment.
Figure 15:
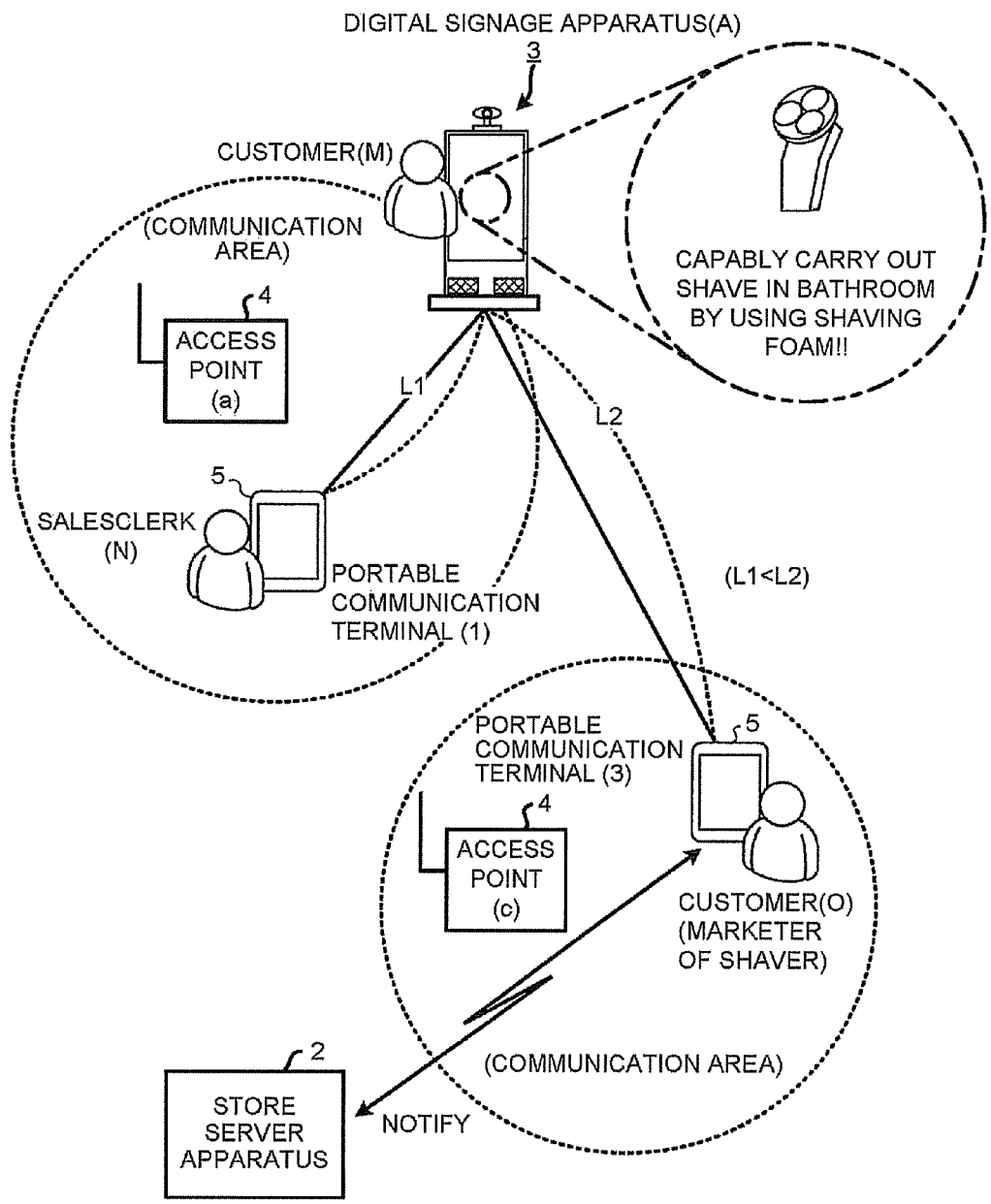
FIG. 15 is a schematic diagram used for describing an example of concrete processing in FIG. 14.

The second embodiment is described by utilizing FIG. 13 to FIG. 15.

FIG. 13 is a functional block diagram showing the functional compositions of the store server apparatus 2 of the second embodiment. The functional compositions of the store server apparatus 2 of the second embodiment are formed in the way that the notified target salesclerk specification section 212 in the functional compositions (refer to FIG. 7) of the first embodiment is altered into a notified target salesclerk specification section 212a and other compositions are the same as the functional compositions of the first embodiment. Hence, compositions of the notified target salesclerk specification section 212A is only shown in FIG. 13, and the graphical representation of the compositions the same as the functional compositions of the first embodiment is omitted.

That is, the notified target salesclerk specification section 212A comprises a displayed advertising specification section 212d and a salesclerk decision section 212e.

The displayed advertising specification section 212d specifies the advertised commodity that the received target customer is watching. Particularly, the displayed advertising specification section 212d specifies the advertised commodity that the received target customer is watching based on the advertising information (the advertising content such as the picture and the image of the advertised commodity, the article introducing or describing the advertised commodity, and the like) pre-stored in the store section 26 and displayed on each digital signage apparatus 3, schedule information showing the display schedule of the advertising content, the current moment information of a clock, and the like.

The salesclerk decision section 212e specifies the salesclerk presiding over the sell of a specific advertised commodity as the notified target salesclerk carrying out the reception on the received target customer and further notified of the existence of the received target customer based on the advertised commodity specified by the displayed advertising specification section 212d and the presided commodity information (the registration table storing a salesclerk ID and the information of a presided commodity associated with the salesclerk ID, and the like) relevant with the commodity whose sell is presided over by each salesclerk, which is pre-stored in the store section 26, and further, specifies the salesclerk ID of the salesclerk presiding over the sell of the advertised commodity and the portable ID of the portable communication terminal 5 carried by the salesclerk.

In such a condition, the notification control section 213 executes the notification processing used for displaying the reception information I shown in FIG. 8 on the portable communication terminal 5 of the portable ID specified by the salesclerk decision section 212e.

FIG. 14 is a flow chart used for describing the detailed content of the specification processing of the notified target salesclerk of the second embodiment. As shown in FIG. 14, in such a condition, the notified target salesclerk specification section 212A first specifies the advertised commodity that the received target customer is watching by the displayed advertising specification section 212d (Act S44).

The salesclerk decision section 212e specifies the salesclerk presiding over the sell of the advertised commodity specified in Act S44, and specifies the salesclerk as the notified target salesclerk carrying out the reception on the received target customer and further notified of the existence of the received target customer (Act S45).

An example of concrete processing in FIG. 14 is described by utilizing FIG. 15. FIG. 15 is a schematic diagram used for describing the example of the concrete processing in FIG. 14.

For instance, processing operations in a status shown in FIG. 15 are described. That is, in FIG. 15, on the condition that there are the salesclerk (N) who carries the portable communication terminal (1) 5 whose portable ID is "1" and whose salesclerk ID is "N" and the salesclerk (O) who carries the portable communication terminal (3) 5 whose portable ID is "3" and whose salesclerk ID is "O" in the store is shown. Moreover, in FIG. 15, on the condition that the received target customer (M) watches the advertising information (advertised commodity "shaver") displayed on the display section 31 of the digital signage apparatus (A) 3 whose signage ID is "A" is shown. Moreover, in FIG. 15, on the condition that the salesclerk (N) is positioned in the communication area of the access point (a) 4 installed near the digital signage apparatus (A) 3 is shown. Moreover, in FIG. 15, on the condition that the salesclerk (O) presiding over the sell of the advertised commodity "shaver" is positioned in the communication area of the access point (c) 4 installed at an interval with the digital signage apparatus (A) 3 is shown.

In the example in FIG. 15, similar to the example in FIG. 12, on the condition that the relationship of "L1<L2" exists between L1 and L2 when the distance of the digital signage apparatus (A) 3 and the salesclerk (N) is set to be L1 and the distance of the digital signage apparatus (A) 3 and the salesclerk (O) is set to be L2, and further, the salesclerk (N) approaches the vicinage of the digital signage apparatus (A) 3 more than the salesclerk (O) is shown.

That is, in a status shown in FIG. 15, in the flow chart in FIG. 14, the store server apparatus 2 specifies that the advertised commodity that the received target customer is watching is "shaver" by the displayed advertising specification section 212d in Act S44.

In Act S45, the salesclerk decision section 212e specifies the salesclerk (O) presiding over the sell of the advertised commodity "shaver" specified in Act S44 as the notified target salesclerk carrying out the reception on the received target customer and further notified of the existence of the received target customer, and further specifies the salesclerk ID "O" of the salesclerk (O) and the portable ID "3" of the portable communication terminal (3) 5 carried by the salesclerk (O).

As thus, after the notification processing in Act S5 in FIG. 9, the reception information I as shown in FIG. 8 is displayed on the display section 54 of the portable communication terminal (3) 5 carried by the salesclerk (O), and the salesclerk (O) presiding over the sell of the advertised commodity that the received target customer (M) is watching and further having the professional knowledge of the advertised commodity goes up to receive the received target customer (M). Thus, the advertised commodity can be promoted properly, and the promotion chance of the advertised commodity and the sell chance of the advertised commodity cannot be missed, so that the improvement of the sales volume of the advertised commodity can be realized.

According to the embodiments described above, the improvement of the sales volume of the advertised commodity propagandized on the digital signage apparatus (advertising apparatus) 3 can be realized.

According to the present embodiment, in the condition that the customer watching the advertising information displayed by the display section 31 of the digital signage apparatus 3 for a specified time, that is, the customer considered to be interested in the advertised commodity, exists, the proper promotion of the advertised commodity can be carried out on the customer quickly, so that the further improvement of the sales volume of the advertised commodity can be realized.

According to the present embodiment, the advertised commodity can be promoted before the received target customer leaves from the vicinity of the digital signage apparatus in the way that the salesclerk near the received target customer goes up to receive the received target customer, and the promotion chance of the advertised commodity and the sell chance of the advertised commodity cannot be missed, so that the improvement of the sales volume of the advertised commodity can be realized.

According to the present embodiment, the advertised commodity can be promoted properly in the way that the salesclerk presiding over the sell of the advertised commodity that the received target customer is watching goes up to receive the received target customer, and the promotion chance of the advertised commodity and the sell chance of the advertised commodity cannot be missed, so that the improvement of the sales volume of the advertised commodity can be realized.

Hereinbefore, the invention is described based on the illustrative embodiments, but the invention is not limited to the embodiments.

In the embodiments described above, the form that the configuration position of the access point 4 is specified as the current position of the portable communication terminal 5 accessing the access point 4 is described, but the portable communication terminal 5 also can be specified by utilizing other methods.

The form that the current position of each portable communication terminal 5 is specified by utilizing an indoor GPS technology can be available, and the form that an RFID label is additionally added on the portable communication terminal 5, network equipment with a label reading function is configured at all positions in the store, and the configuration position of the network equipment reading the RFID label of the portable communication terminal is specified as the current position of the portable communication terminal 5 also can be available.

A specified electric wave signal further can be transmitted from an electric wave receiving-transmitting apparatus installed in the store, afterwards, the electric wave receiving-transmitting apparatus receives the response of each portable communication terminal 5 carried by each salesclerk to a specified electric wave signal, that is, a response electric wave signal, and the current position of each portable communication terminal 5 is specified according to the foldback speed of each response electric wave signal.

In the embodiments described above, as a method specifying the position of the salesclerk, the form that the position of the salesclerk is specified by specifying the current position of the portable communication terminal 5 carried by the salesclerk is described, but is not limited to that, for instance, the form that the salesclerk carries an ID card in which the RFID label is embedded, the network equipment with the label reading function is configured at all the positions in the store and the configuration position of the network equipment reading the RFID label of the ID card held by the salesclerk is specified as the position of the salesclerk further can be available.

In the embodiments, the form that the notification processing (that is, the processing of displaying the reception information I shown in FIG. 8) is respectively executed on the portable communication terminal 5 carried by a plurality of salesclerks individually in the condition that the plurality of salesclerks exist in the communication area of the access point 4 installed near the digital signage apparatus 3 by which the received target customer watches the advertising is described, but is not limited to that.

For instance, the following form that the coordinate information of each salesclerk in the store and the coordinate information of the digital signage apparatus 3 displaying the advertising information that the received target customer is watching are acquired, the distance of the digital signage apparatus 3 and each salesclerk is solved for, the salesclerk with a shortest distance, that is, the salesclerk who is the nearest to the digital signage apparatus 3 displaying the advertising information that the received target customer is watching is specified as the notified target salesclerk, and the notification processing is executed on the portable communication terminal 5 carried by the specified salesclerk further can be available.

In the second embodiment, the form that the notification is carried out on the notified target salesclerk (having the processional knowledge of the advertised commodity) presiding over the sell of the advertised commodity that the received target customer is watching is described, but in the second embodiment, the following form that the store server apparatus 2 transmits the notification data of the reception information used for detaining the received target customer during a period before the arrival of the notified target salesclerk to the portable communication terminal 5 carried by the salesclerk near the received target customer in the condition that the store server apparatus 2 judges that the notified target salesclerk is positioned at a place with a certain distance to the received target customer also can be available.

The first embodiment and the second embodiment further can be combined. That is, when the notified target salesclerk is specified, both of the relative distance of each salesclerk and the digital signage apparatus 3 where the received target customer is positioned and the information of the salesclerk presiding over the sell of the advertised commodity that the received target customer is watching can be considered, so as to specify the notified target salesclerk. For instance, the specification of the notified target salesclerk further can be set to be that, in the condition that the salesclerk presiding over the sell of the advertised commodity that the received target customer is watching is near the received target customer, the salesclerk is specified as the notified target salesclerk, and on the other hand, in the condition that the salesclerk presiding over the sell of the advertised commodity that the received target customer is watching is not near the received target customer, the salesclerk near the received target customer is specified as the notified target salesclerk.

In the embodiments, even though not particularly described, the embodiments also can be set to be that, in the condition that each portable communication terminal 5 comprises an acceleration transducer and the like, after the store server apparatus 2 executes the notification processing in Act S5, the notified target salesclerk is judged whether or not to actually receive the received target customer based on the movement information of the portable communication terminal 5 sensed by the acceleration transducer of the portable communication terminal 5 carried by the notified target salesclerk, and in the condition that the notified target salesclerk is judged still not to go up to receive the received target customer after certain time, the processing of the notification urging the reception towards the portable communication terminal 5 carried by the notified target salesclerk is executed.

A map image guiding the salesclerk to go to the place where the received target customer is positioned also can be included in the reception information I in the embodiments.

In the embodiments described above, the form that the store server apparatus 2 comprises a customer recognition function is described, but is not limited to that, for instance, the form that each digital signage apparatus 3 comprises the customer recognition function also can be available.

In the embodiments described above, the form that the display section 54 of the portable communication terminal 5 is utilized as a method notifying the reception information is described, but is not limited to that, and other notification methods also can be adopted. For instance, the form that the reception information is notified to the salesclerk by utilizing the sound output section 56 further can be set.

In the embodiments described above, the form that the notification data are transmitted to the portable communication terminal 5 carried by the salesclerk is described, but is not limited to that, and the form that the notification data are transmitted to a specified information processing apparatus {such as a personal computer (PC: Personal Computer) and the like} installed at the backyard and the like of the store also can be set.

In the embodiments described above, the form that each digital signage apparatus 3 propagandizes the commodity sold in the store based on the advertising content received from the store server apparatus 2 is described, but is not limited to that, and the form that each digital signage apparatus 3 propagandizes the commodity based on the advertising content pre-stored in the self store section 36 also can be set.

Each digital signage apparatus 3 of the embodiments further can comprise a printing apparatus (printer) printing and issuing various bills, coupons and the like, a reading apparatus reading information such as a customer ID and the like from a store medium such as a membership card held by the customer, a mobile phone and the like, a communication apparatus carrying out short-distance communication with the mobile phone held by the customer, and the like.

In the embodiments described above, the form that the capturing apparatus (image capturing section 33) capturing the customer watching the advertising information displayed by the display section 31 of the digital signage apparatus 3 is installed on each digital signage apparatus 3 is described, but is not limited to that, and the image capturing apparatus also can be installed at a place far away from the digital signage apparatus 3. For instance, the image capturing apparatus also can be installed at the ceiling and the like of the store.

The program executed by the store server apparatus 2 of the embodiments can be provided by being previously programmed in the store section such as the ROM and the like. Moreover, the program also can be provided by being stored in a computer-readable store medium by a file in an installable way or an executable way. In addition, the program also can be provided or issued through a network such as the Internet and the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus, comprising:
a customer specification section configured to specify a customer as a received target is watching an advertising information displayed on an advertising apparatus advertising a commodity;
a salesclerk specification section configured to specify a salesclerk as a notified target based on at least one of the advertising information that the customer as the received target is watching specified by the customer specification section and the position of each salesclerk;
a notification section configured to notify the existence of the customer as the received target specified by the customer specification section to a portable communication terminal carried by the salesclerk as the notified target specified by the salesclerk specification section; and
a determination section configured to determine, after the notification section notifies the existence of the customer as the received target specified by the customer specification section to the portable communication terminal carried by the salesclerk as the notified target specified by the salesclerk specification section, whether the notified target salesclerk has actually received the received target customer, wherein when the determination section determines that the notified target salesclerk has not still received the received target customer by determining each current position of the portable communication terminal; wherein the each current position of the portable communication terminal is specified by utilizing an indoor GPS technology to determine that the notified target salesclerk has not still received the received target customer by a change of position from determining each current position of the portable communication terminal; wherein the notified target salesclerk has not still received the received target customer is determined by comparing the change of position to a threshold value, the notification section sends a reminder of receiving the received target customer to the portable communication terminal carried by the notified target salesclerk.

2. The information processing apparatus according to claim 1, wherein
the customer specification section specifies the customer as the received target according to the form of the customer included in a captured image captured by a image capturing apparatus.

3. The information processing apparatus according to claim 1, wherein
the salesclerk specification section specifies the salesclerk near the advertising apparatus displayed the advertising information that the customer as the received target is watching as the salesclerk as the notified target.

4. The information processing apparatus according to claim 1, wherein
the salesclerk specification section specifies the salesclerk presiding over the sell of the commodity propagandized by the advertising information that the customer as the received target is watching as the salesclerk as the notified target.

5. The information processing apparatus according to claim 1, wherein
the notification section notifies the characteristic of the customer as the received target and the advertising information that is watching by the customer.

6. A method, comprising:
specifying a customer as a received target is watching an advertising information displayed on an advertising apparatus advertising a commodity;
specifying a salesclerk as a notified target based on at least one of the advertising information that the customer as the received target is watching specified and the position of each salesclerk;
notifying the existence of the customer as the received target specified to a portable communication terminal carried by the salesclerk as the notified target specified; and
determining, after notification of the existence of the customer as the received target specified to the portable communication terminal carried by the salesclerk as the notified target specified, whether the notified target salesclerk has actually received the received target customer,
wherein when it is determined that the notified target salesclerk has not still received the received target customer by determining each current position of the portable communication terminal; wherein the each current position of the portable communication terminal is specified by utilizing an indoor GPS technology to determine that the notified target salesclerk has not still received the received target customer by a change of position from determining each current position of the portable communication terminal; wherein the notified target salesclerk has not still received the received target customer is determined by comparing the change of position to a threshold value, sending a reminder of receiving the received target customer to the portable communication terminal carried by the notified target salesclerk.

* * * * *